May 22, 1956 H. BOUCKE 2,747,095
TRANSLATION OF ELECTRICAL REACTANCE VALUES
Filed Nov. 30, 1950 4 Sheets-Sheet 1
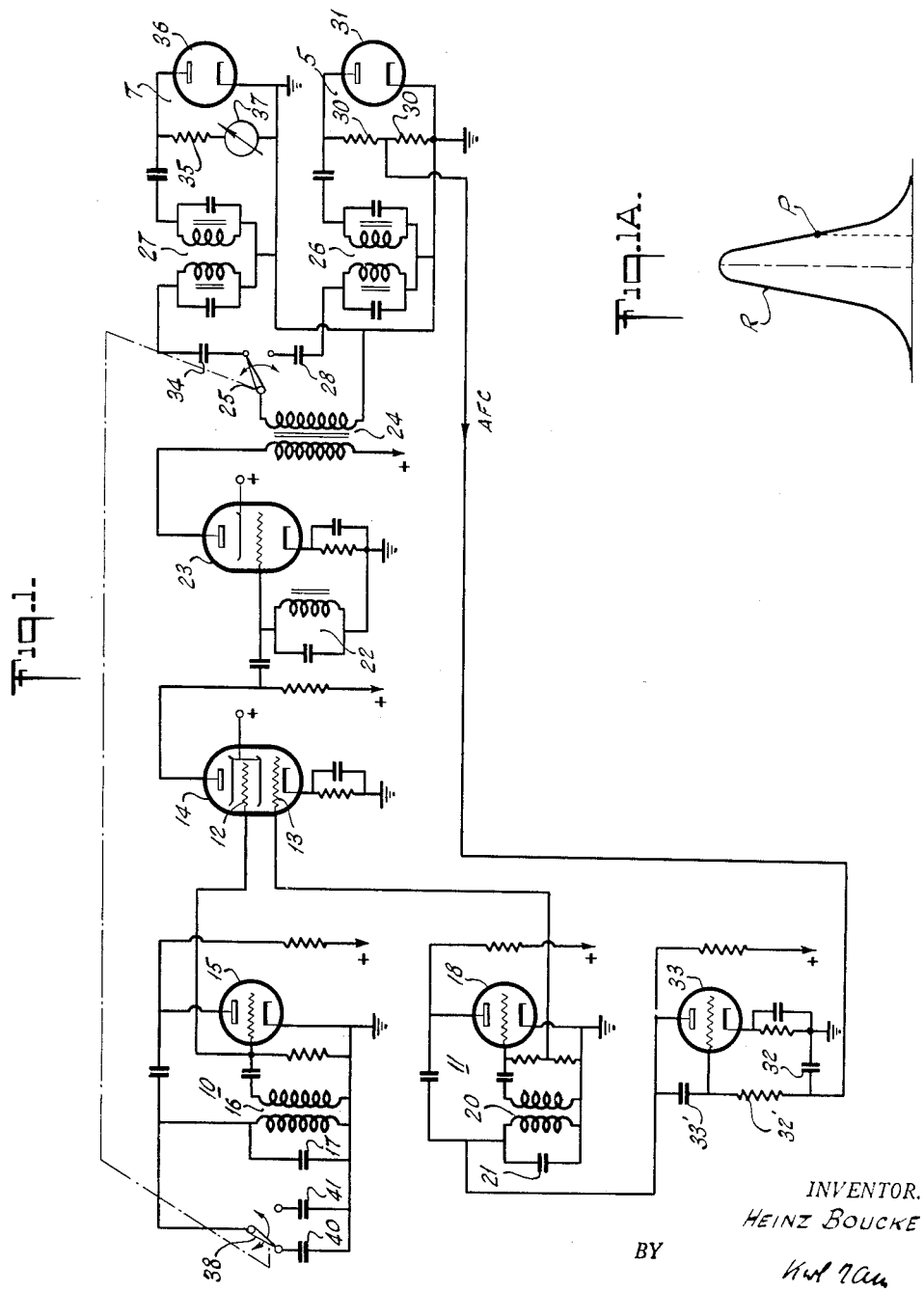
INVENTOR.
HEINZ BOUCKE
BY
ATTORNEY.

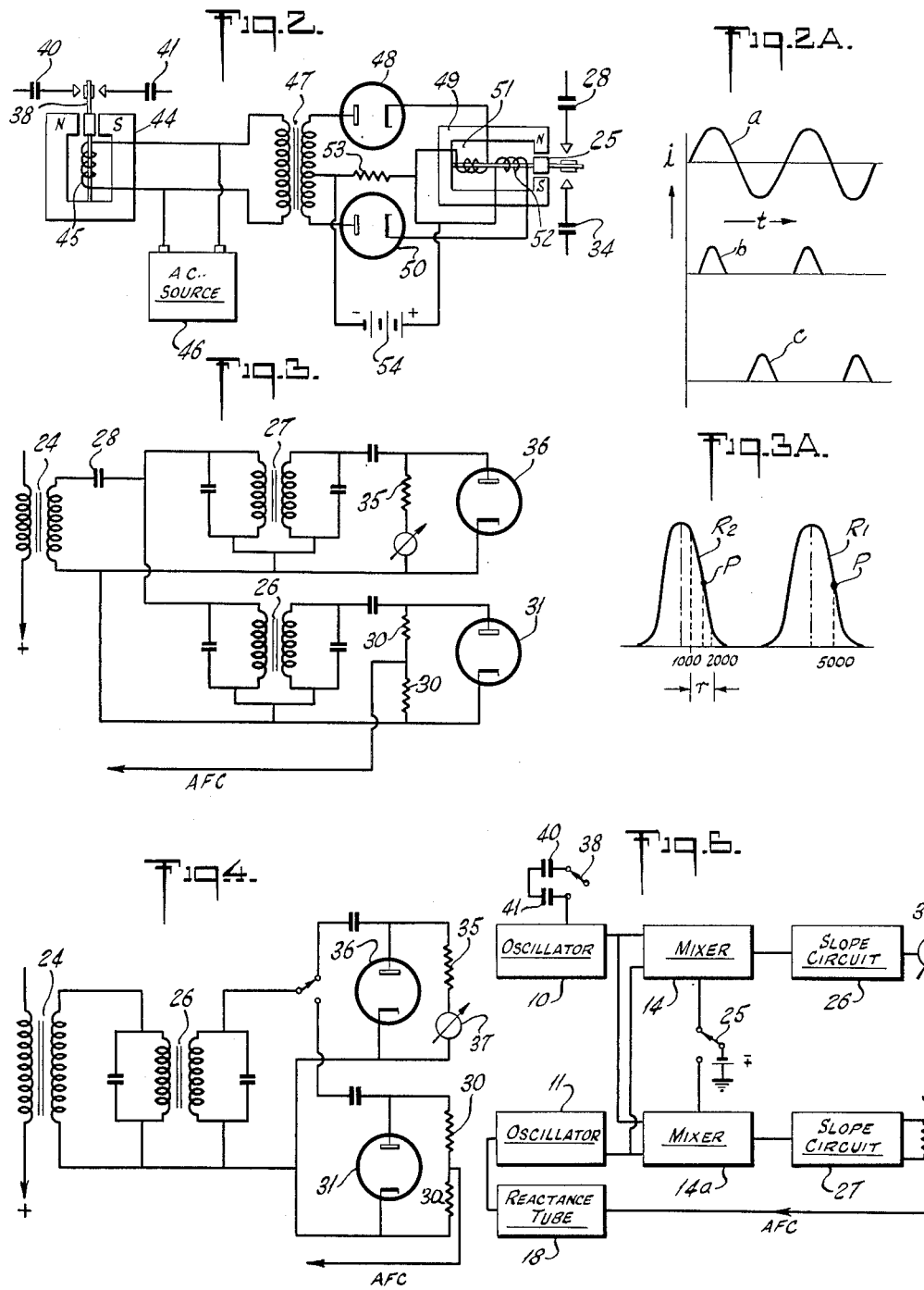

May 22, 1956 H. BOUCKE 2,747,095
TRANSLATION OF ELECTRICAL REACTANCE VALUES
Filed Nov. 30, 1950 4 Sheets-Sheet 3
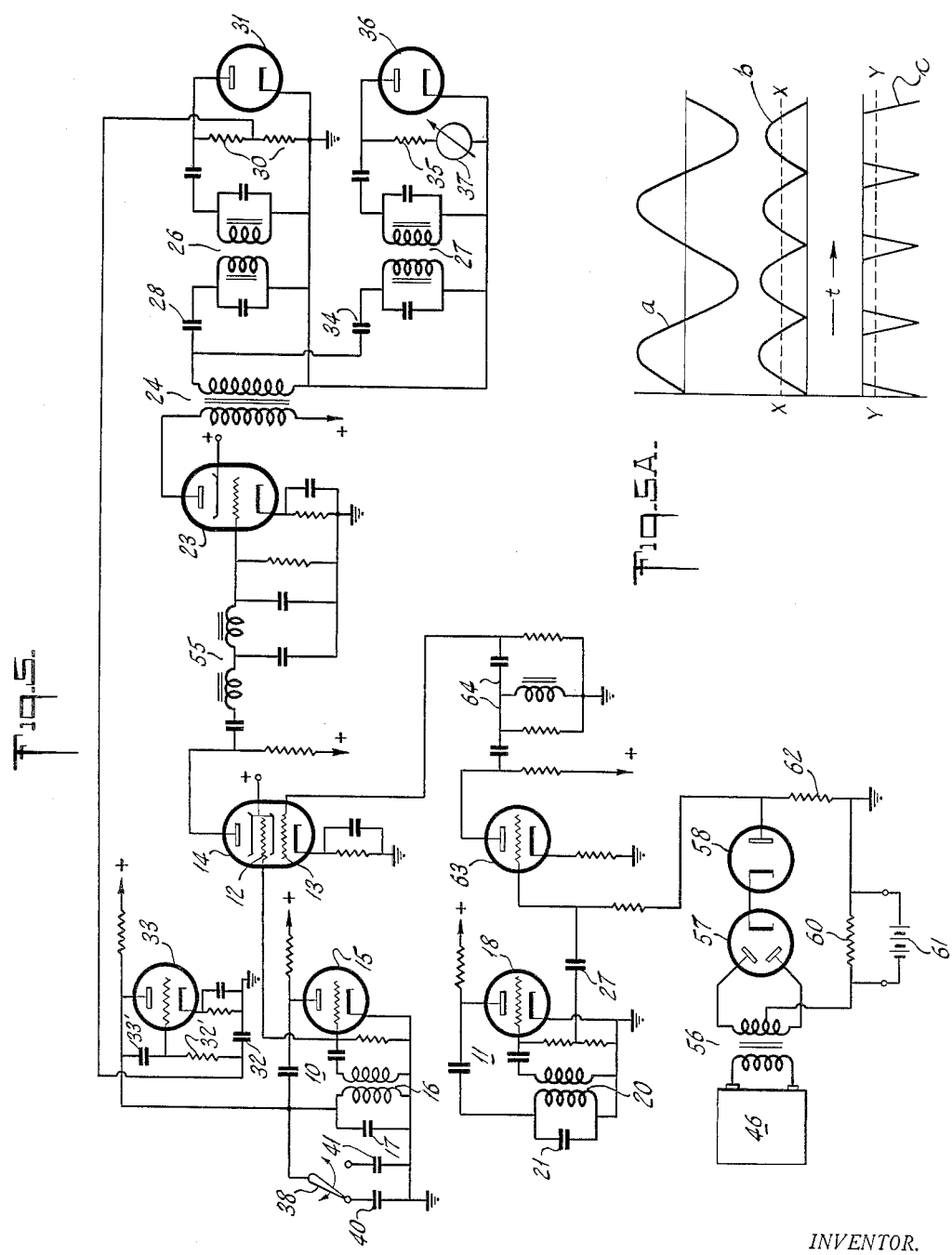
INVENTOR.
HEINZ BOUCKE
BY
ATTORNEY.

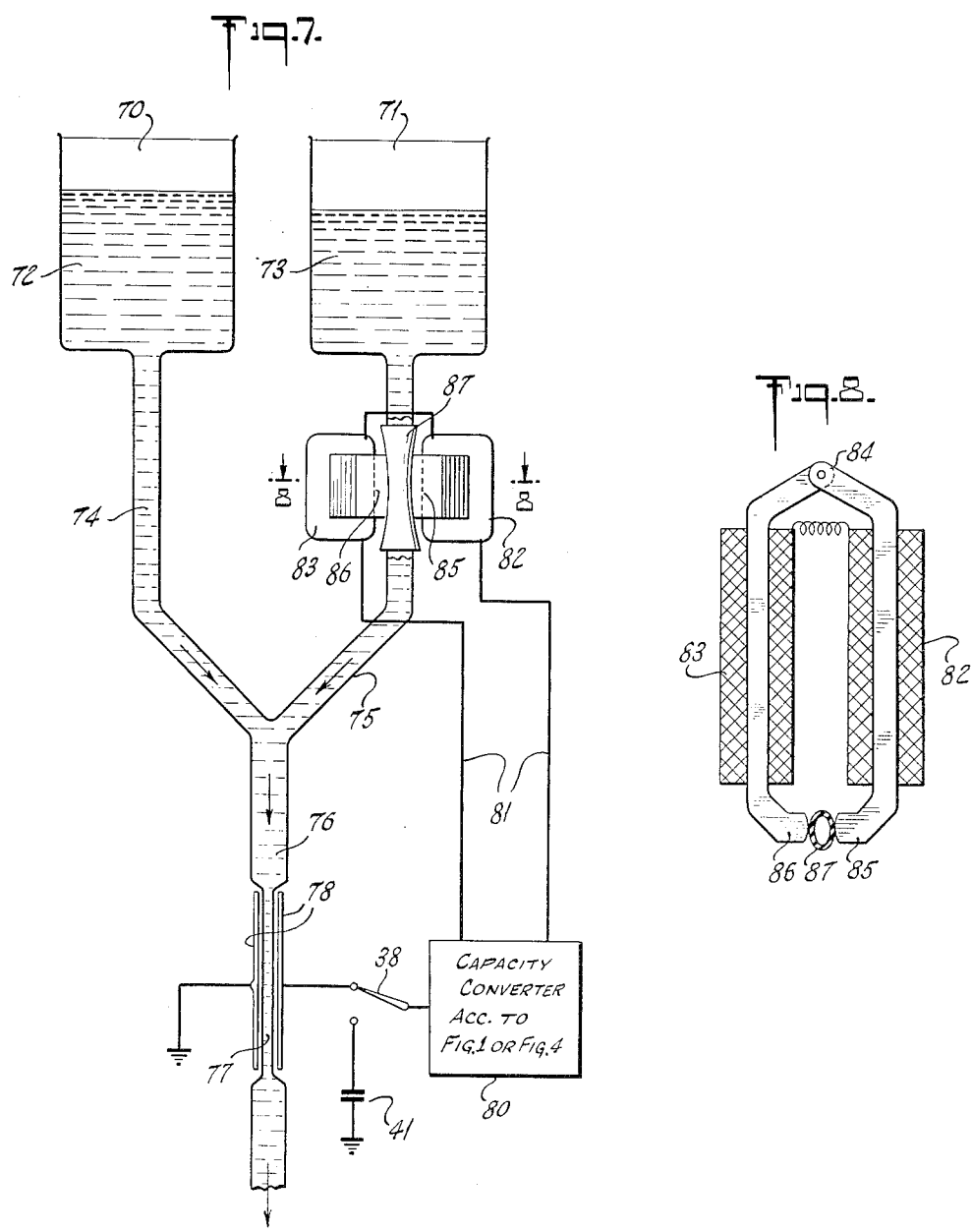

United States Patent Office 2,747,095
Patented May 22, 1956

2,747,095

TRANSLATION OF ELECTRICAL REACTANCE VALUES

Heinz Boucke, Tubingen, Germany, assignor, by mesne assignments, to Radio Patents Company, a partnership Application November 30, 1950, Serial No. 198,331

Claims priority, application Germany April 28, 1949

9 Claims. (Cl. 250—36)

The present invention relates to means for and a method of converting relatively small reactance values, such as electrical capacity or inductance changes into corresponding current variations for measuring, registering or control purposes.

It has already become known to convert capacity changes into corresponding electric current variations by utilizing the change of the difference or beat frequency of a pair of oscillators, the oscillatory or tank circuit of one of said oscillators including the condenser to be tested, as a measure for the capacity change to be determined. By means of arrangements of this type it is possible to obtain relatively high sensitivities. However, the sensitivity or accuracy of the capacity conversion may be considerably impaired by a detuning or drift of the frequency of one or both of the beating oscillators as a result of ambient temperature fluctuations or other atmospheric influences, as well as due to ageing of the electron discharge tubes forming part of the oscillating circuits.

There is of course the possibility of maintaining the temperature within the device substantially constant by means of an electric thermostat control or by using temperature compensated or stabilized parts or circuit elements. Such means are, however, only partially successful in that they do not take into account frequency variations or oscillator drift caused by ageing of the electron emissive layers of the oscillator tubes.

Accordingly, an object of the invention is to provide a novel and improved system and method of the above type for converting relatively small capacity or inductance changes into relatively large proportionate current changes, which is substantially free from the effects of oscillator frequency drift; which is both simple in design and reliable in operation; which after initial adjustment and calibration will require little or no supervision during use; and which is equally suited for translating either capacitative or inductive reactances or changes thereof.

Further objects as well as novel aspects of the invention will become more apparent from the following detailed description of a few practical embodiments thereof, considered in conjunction with the accompanying drawings forming part of this specification and in which:

Figure 1 is a circuit diagram showing a capacity conversion or translating system constructed in accordance with the principles of the invention;

Figure 1A shows a known resonance curve explanatory of the function and operation of the system shown in Figure 1;

Figure 2 is a schematic view of a synchronizing device suitable for use in the system of Figure 1;

Figure 2A shows a few curves explanatory of the function and operation of Figure 2;

Figure 3 is a partial circuit diagram illustrating a modification of Figure 1;

Figure 3A shows a pair of resonance curves explanatory of the function and operation of Figure 3;

Figure 4 is a partial circuit diagram illustrating a further modification of Figure 1;

Figure 5 is a diagram similar to Figure 1, showing still a further modification of the invention;

Figure 5A shows a number of theoretical curves explanatory of the function and operation of Figure 5;

Figure 6 is a block diagram illustrating still another modification of the invention;

Figure 7 is a schematic layout of a system for automatically controlling the mixing ratio between two liquids, utilizing a capacity conversion system of the type according to the invention; and Figure 8 is a section taken on line 7—7 of Figure 7.

Like reference characters identify like parts throughout the different views of the drawings.

With the above-mentioned objects in view, the invention involves generally the provision of periodic switch means for disconnecting the condenser or other reactance being tested during successive time intervals and further means for automatically controlling or adjusting a predetermined beat frequency during the periods of disconnection of said condenser. The last mentioned means may be in the form of any well-known automatic frequency control or stabilizing device commonly used in radio receivers or transmitters, for maintaining a constant beat frequency by automatically readjusting the frequency of one of the beat oscillators of the system to the proper value. The time constant of the automatic tuning or frequency adjustment is so chosen as to cause the effect of the tuning or frequency correction to persist for periods long enough to cover the subsequent operative or connecting periods of the condenser being tested.

In the practical realization of this principle it has been found advantageous, in order to achieve approximately equal or at least like order beat frequencies for the tuning correction and the indication or translation, respectively, to provide a comparison condenser of high stability and approximately equal capacity to the condenser under test, said comparison condenser being connected in place of the test condenser during the interrupting or disconnecting periods of the latter.

Referring more particularly to Figure 1, there are shown a pair of vacuum tube oscillators 10 and 11 generating, in a known manner, high frequency voltages which are impressed upon the control grids 12 and 13, respectively, of a multi-grid converter or electronic mixer tube 14 of known construction, as used in superheterodyne radio receivers or the like.

More particularly, the oscillator 10, in the example shown, comprises a triode 15 and a plate tank circuit consisting of an induction coil 16 shunted by a condenser 17 and being regeneratively coupled with the grid circuit of the tube to produce sustained electrical oscillations of a frequency determined by resonant frequency of the circuit 16—17, in a manner well known and understood by those skilled in the art. Similarly, oscillator 11 comprises a triode 18 and tank circuit consisting of an inductance 20 and condenser 21 arranged and operating in a manner similar to the oscillator 10.

The beat frequency signal generated in the plate circuit of the mixer tube 14, which may have a sufficiently low frequency of a few thousand cycles per second, is segregated by means of a tuned circuit or filter 22 and applied to the control grid of a low frequency amplifier tube 23. As is understood, additional amplifiers may be provided to produce a beat frequency signal of desired intensity, these and other well known details being omitted from the present disclosure as immaterial for the understanding of the invention.

The plate circuit of the low frequency amplifier 23 includes an output transformer 24 which has a secondary winding connectable to either of a pair of resonant circuits or band-pass filters 26 and 27 by means of a commutating switch 25 and by way of coupling condensers 28 and 34, respectively. The output sides of the filters 26 and 27 are connected to separate rectifier circuits comprising, in the example shown, a pair of diodes 31 and 36 shunted by load resistors 30 and 35, respectively. The rectifier circuit connected to the filter 27 also includes a direct current indicator such as a microammeter 37.

The direct current potential developed in the diode circuit 30—31 and derived from a suitable tap point of the resistor 30 serves to control or excite the grid of a reactance control tube 33 effectively connected to the oscillator 11, for automatically controlling the frequency of the latter in a manner described in detail in the following.

Assuming that the switch 25 connects the transformer 24 to the filter or resonant circuit 26 by way coupling condenser 28, and provided furthermore that the beat frequency coincides approximately with the center point P, Figure 1A, of one of the branches of the resonance curve R of the circuit 26, a control voltage will be produced in the rectifier circuit 30—31 which after sufficient smoothing by means of a condenser 32 is directly proportional to the beat frequency and may serve in a known manner to control the effective reactance between the anode and cathode of the control tube 33 and in turn the frequency of the oscillator 11. Control tube 33 is connected in a known manner with its anode-cathode path effectively shunted across the oscillator tank circuit 20—21, a suitable phase shift network comprising a condenser 33' and resistor 32' in series being also connected across said tank circuit to provide suitable quadrature grid control potential for the tube 33, in a manner well understood by those skilled in the art.

By using either the upper or lower beat frequency, by properly choosing the operating point upon either of the two branches of the resonance curve R, and by a suitable polarity connection of the rectifier 31, the operation of the control system may be stabilized, in such a manner that the frequency change resulting from a tuning correction will occur in a sense opposite to the amplitude change of the frequency control voltage.

During the succeeding half of the operating cycle switch 25 the transformer 24 is connected to the filter 27 by way of coupling condenser 34, and provided that the filter 27 is adjusted in relation to the beat frequency in substantially similar manner to the filter 26, the rectified current in the output of the filter 27 will be proportional to and a direct measure of the beat frequency, i. e., in turn the capacity of a test condenser 40 connected across the tank circuit 16—17 of the oscillator 10. Accordingly, the instrument 37 may be directly calibrated in capacity units, to afford a direct capacity indication. Alternatively, the capacity changes may be continuously recorded by applying the rectified current in the circuit 35—36 to a suitable recording instrument or registering device. Finally, the frequency—or capacity—dependent output current in the circuit 35—36 may serve to operate a suitable control device, such as is customary in follow-up or automatically rebalanced translating or control systems well known in the art and described in greater detail in the following.

In order to effect an intermittent or alternate testing and automatic beat frequency control in the manner described, there is provided a further switch 38 which serves to alternately connect the condenser 40 being tested and a comparison condenser 41 of constant capacity, respectively, to the tank circuit 16—17 of the oscillator 10. Both switches 25 and 38 are operated in synchronism, the arrangement and relative phase of the switching operations being such that, while switch 38 disconnects the test condenser 40, switch 25 disconnects the circuit 27, and, vice versa, that during the connecting period of the comparison condenser 41, the tuned circuit 26 of the automatic frequency control is connected to the output of the amplifier 23, for correcting or readjusting the beat frequency to the desired value, as will be readily understood.

From the foregoing, it will be evident that, by the use of an arrangement of the type described, undesirable fluctuations or drift of the frequency of either or both of the beating oscillators 10 and 11 are rendered practically harmless and without effect upon the accuracy and reliability of the capacity or frequency conversion. On the other hand, variations of the test condenser 40 will be converted to its full extent into corresponding beat frequency changes and in turn proportionate variations of the output current in the rectifier circuit 35—36, inasmuch as the beat frequency determined by the test condenser excites only the circuit 27 connected with the indicator or equivalent translating device but has no effect upon the circuit 26 of the tuning control system.

If mechanical switches 25 and 38 are used, the synchronous operation may be obtained in a simple manner by a direct mechanical coupling of the vibratory or rotating switching contacts. When using electrical synchronization it is necessary, in addition to equal switching frequencies, to maintain a fixed or constant phase relation between the switching operations. The switches may be in the form of rotating or vibrating members of the type well known in the art. In view of the relatively small power involved, polarized relays are specially suited as switching elements.

In order to avoid the effect of transients or slight phase displacements between the switching operations upon the automatic frequency control and capacity indication, means are provided, according to a further feature of the invention, to cause the closing periods of the switch 25 in both positions to be somewhat less than the connecting or closing periods of the switch 38, or, in other words, to hold the switch 25 during a small time interval in the central or neutral position. This has the result that transient currents or voltages occurring during the switching of the oscillator 10 and liable to cause short beat frequency noises of wide band width, will be substantially without effect upon the resonant or tuned circuits 26 and 27.

A practical arrangement of the latter type using an amplitude limiter or clipping circuit is shown in Figure 2. In the latter, the switch arm 38 is formed by the vibrating armature of a polarized relay having a magnet core 44 and a magnetizing winding 45 for said armature. A suitable alternating current voltage for energizing the winding 45 is supplied by a source 46 which may be an audio frequency oscillator generating a current of low frequency, say about 10 cycles. The same source serves to control the switch 25 or vibrating armature of a further polarized relay having a magnet 49, by way of a transformer 47 and a pair of rectifiers shown in the form of diodes 48 and 50, respectively. This relay differs from the first relay in the provision of a pair of operating windings 51 and 52 for the armature 25 which are wound in opposite directions, as shown in the drawing. Each of the windings 51 and 52 is energized by the output current of one of the rectifiers 48 and 50, respectively, which are connected to the secondary winding of the transformer circuit 47 in the manner of a double wave rectifier circuit. There is furthermore inserted in the common return path of the rectifier circuit a direct current biasing voltage supplied by a suitable source such as batter 54 and applied to a resistance 53 connected in the common return path of the said rectifiers.

As a result, the starting of the rectified current pulses will be somewhat delayed, depending upon the magnitude of the biasing voltage. A special biasing battery may be dispensed with by producing a D. C. biasing voltage across the resistor 53 by the rectified current by shunting this resistor by a relatively large smoothing condenser. Provided the natural frequency of the armature is substantially above the switching frequency, it is possible by the provision of a biasing voltage as described to cause the armature to remain in its central or neutral position during a brief time period, depending upon the value of said biasing voltage. This fact is illustrated in Figure 2A, wherein curve *a* represents the alternating current passing through the winding 45 of the relay 44, curve *b* represents the rectified current pulses through the winding 51 and curve *c* represents the current pulses through the winding 52 of the relay 49.

According to a further feature of the invention, it is possible to dispense with the switch 25 by so designing the comparison condenser 41 that during its connection to the circuit a substantially different beat frequency is produced compared with the beat frequency during the connection of the test condenser 40, and by correspondingly designing and adjusting the band-pass filters or resonant circuits 26 and 27 with their natural or resonant frequencies sufficiently separated from each other to prevent mutual interaction between the translating and frequency control circuits. According to a practical example, the capacity variations of the test condenser 40 may comprise a range corresponding to a beat frequency range from 1,000 to 2,000 cycles per second, while the beat frequency during the connections of the comparison condenser 41 may have a value of 5,000 cycles per second. In this case, the filter 26 is so designed as to have a resonance curve with an upper branch whose center frequency (center point P, Figure 1A) is equal to 5,000 cycles, while the filter 27 is designed to have a resonance curve the upper branch of which comprises a substantially linear range *r* (see Figure 3A) between 1,000 and 2,000 cycles, as will be readily understood. In such an arrangement both filters may be permanently connected to the output of the tube 23 by way of the coupling condensers 28 and 34, substantially without the danger of mutual interference between the circuits. The fact that the oscillator 10, during the tuning control periods, operates at a frequency which is different from its frequency during the testing periods has little effect upon and does not essentially interfere with the function and operation of the circuit in accordance with the invention. As is understood, it is necessary in this case that the filter 22 be designed with a sufficiently broad band width so as to pass both beat frequencies.

An arrangement of this type is illustrated by Figures 3 and 3A. In Figure 3 the band pass filters 26 and 27 having resonance curves, as shown at R₁ and R₂ in Figure 3A are permanently connected to the output winding of transformer 24, the remaining part of the circuit being substantially similar to the circuit previously described.

According to further modification of the circuit of Figure 1 as shown in Figure 4, a single band pass filter or resonant circuit 26 is permanently connected to the output of the transformer 24 and the output of the filter 26 is alternately and periodically applied to either of the rectifier circuits 30—31 and 35—36, respectively, whereby to provide testing and frequency control periods in accordance with the basic principle of the invention. In this case, it is necessary to use switching periods of sufficient duration to make sure that the alternating voltages occurring at the instants of connection of the condensers 40 and 41 in the output of the beat frequency filter 22, have sufficiently decayed at the instant of connection of the next rectifier circuit.

Referring to Figure 5, there is shown an embodiment of the invention utilizing an intertialess electronic switch in place of the switch 25 of Figure 1. Numerals 10 and 11 again represent a pair of oscillators, 14 is the mixer tube which serves to produce a beat frequency signal applied to the low frequency amplifier 23 by way of a band-pass filter 55. The amplified beat frequency signal is permanently applied, by way of transformer 24, to the two band-pass or slope filters 26 and 27 serving to produce the tuning control and indicating voltages, respectively, in the manner described. The resonant frequencies of the filters 26 and 27 are again sufficiently separated to obtain direct currents or voltages substantially independent from each other. Switching in this circuit is used in order to minimize the effect of transient currents or voltages resulting from relatively high switching frequencies. This is obtained by so designing the switching devices and circuits that the beat frequency currents or voltages will be produced only after the build-up and decay phenomena resulting from the switching operation have progressed to a sufficient extent.

More particularly, in order to accomplish this purpose, one of the two oscillator voltages, i. e. the voltage derived from the oscillator 11 in the example illustrated and applied to the control grid of the mixer 14, is periodically connected and disconnected in the manner as described in the following. The generator or source 46 supplying the switching control current which may have a relatively high frequency, say about 30 cycles, is applied by way of a transformer 56 to a double-wave rectifier 57. As a result, the input voltage supplied by the source 46 shown at *a* in Figure 5A will be converted into a rectified or pulse voltage in the output circuit of the rectifier, as shown at *b* in Figure 5A. This rectified voltage is not yet suitable for effecting the switching operation and for this purpose is subjected to an amplitude limiting or clipping action by the provision of the further one-way rectifier or diode 58 and a fixed direct current voltage both inserted in the output circuit of the rectifier 57.

In the example shown, the current limiting direct voltage is supplied by a battery 61 shunted by a resistor 60, in a manner well known in connection with similar amplitude limiting or clipping circuits known in the art. As a result, the amplitudes of the current pulses shown at *b* in Figure 5A will be clipped or limited, as indicated by the dashed line *x—x*, depending upon the magnitude of the voltage 61, whereby to produce voltage pulses as shown at *c* in Figure 5A across the output resistor 62 of the rectifier circuit. These negative voltage pulses are applied to the grid of a switching tube 63 which is connected between the output of the oscillator 11 and the input grid 13 of the mixer tube 14. By suitable design and adjustment of the voltages, the switching tube 63 will be blocked completely by a relatively low negative grid potential as indicated by the dashed line *y—y* in Figure 5A.

In an arrangement as shown in Figure 5, a phase adjusting device or circuit may be provided preceding either the switch or relay 38, which may be of the type as shown in Figure 2, or the transformer 56. In this manner, the switching operations may be so adjusted that the mechanical switching by the switch 38 coincides exactly with the center of the switching periods of the tube 63. In order to prevent direct current pulses occurring in the plate circuit of the tube 63 from interfering with the operation of tube 14, a suitable filter 64 is arranged between the output of the switching tubes 63 and 64.

According to a modification of the circuit shown in Figure 5, filters having equal resonance curves may be used by the provision of a pair of separate mixer tubes producing beat frequencies for effecting the indication and frequency control, respectively. By means of a suitable switching arrangement, either mechanical or electrical, the mixers are alternately and periodically blocked by applying thereto a suitable negative control voltage, to result in an alternate indication and automatic frequency control, in accordance with the basic principle of the invention.

An arrangement of the latter type is shown in block diagram form by Figure 6. In the latter, each of the oscillators 10 and 11 are connected to a pair of mixers 14 and 14a which are in turn connected to identical bandpass filters and rectifiers 26 and 27 for producing indicating and frequency control voltages, respectively, in substantially the same manner as in the preceding arrangements. The mixers 14 and 14a are rendered alternately conductive by the application of a suitable blocking voltage applied by means of the mechanical switch 25 or by an electric control circuit, in a manner as will be readily understood from the foregoing.

In order to render the indication independent of small fluctuations or irregularities of the switching frequency, it is advantageous to use a peak voltmeter designed with a charging period which is short compared with its discharging periods. It will be furthermore understood that any known type of switching device or arrangement, such as a rotary cathode ray switch or the like known in the art, may be employed for the purpose of the invention. Furthermore, while a special automatic frequency control (AFC) circuit has been shown for the purpose of illustration, any of the various circuits and arrangements of this type known in the art may be used for the purpose of the invention.

When using a test condenser 40 of very small value and with the beat frequencies for the indication and frequency control being substantially different from each other, it is possible to dispense with the standard condenser 41. In this case, even with the beat frequencies being equal during both switching positions, the condenser 41 may be omitted in the special case if the oscillators are so adjusted that the frequency of the oscillator 10 during the connection of the test condenser is reduced to the same extent as it has been increased by the frequency of the oscillator 11 during the preceding control period. Other special cases arise when using harmonics of the oscillator for producing the required beat frequency.

It will be furthermore understood that the indicating instrument 37 shown in the drawing may be replaced by a recorder for continuously registering the capacity changes of the test condenser 40 or other magnitude of which the capacity is a function. Alternatively, the output current supplied by the rectifier 36 being proportional to the capacity under test may serve to operate a suitable control device which in turn readjusts the capacity of the test condenser in such a sense has to obtain an automatic control upon a desired value, as is customary with automatic control systems known in the art.

A practical example of a control system of the latter type is schematically shown in Figures 7 and 8. The latter illustrate an arrangement for continuously maintaining a desired mixing ratio between a pair of liquids 72 and 73 supplied from the containers 70 and 71, respectively, said liquids being distinguished from each other by different dielectric constants. Both liquids are passed through a pair of feed channels or tubes 74 and 75 into a common mixing chamber 76. Chamber 76 is made of insulating material, such as glass, etc., and has a constricted flattened portion 77. A pair of electrodes 78 arranged at both sides of the portion 77 provide an electrical condenser whose capacity is measured or translated by means of a system described by the invention. The electrode 78 may be either in the form of separate plates as shown in the drawing or may consist of metallic coatings or layers directly applied upon the outside surface of the portion 77. The greater the dielectric constant of the mixture at this point the greater will be the capacity of the condenser, as is understood. It is apparent that the measured capacity or indication obtained from the output of the system will in turn enable a conclusion relative to the mixing ratio of the liquids.

In Figure 7 the capacity translating system is indicated schematically by the rectangle 80, the input circuit again comprising the test formed by the electrodes 77 and a fixed or comparison condenser 41, in the manner described above. In order to obtain an automatic control of the mixing ratio, the output current of the rectifier obtained from the indicating or measuring circuit is applied by way of conductors 81 to a pair of solenoid windings 81 and 82 each having a magnet core 85 and 86, said magnets having one end connected pivotally as at 84 and having their opposite ends pressing against an elastic section 87 inserted in the supply tube 75. The design and adjustment of the various elements is such that when the mixing ratio varies in either sense from a desired value the resultant output current obtained from the system 80 will result in a variation of the pressure exerted by the armatures 85 and 86, whereby to counteract the initial variations of the ratio by either increasing or reducing the cross section of the member 87, to thereby restore and maintain the mixing ratio of both liquids to a predetermined or desired value.

It is furthermore understood, that the invention is not limited to the indication, conversion or translation of capacitative reactances, but applies with equal advantage to the conversion of inductive reactance changes, in which case the test condenser 40 is replaced by a variable inductance element, such as a reluctance pressure gauge or the like, while the comparison condenser 41 is in the form of a standard inductance or condenser, if different beat frequencies are used for the testing and frequency control, respectively. Such a reluctance gauge or transducer may be composed of one or more coils of wire and a core of magnetic material. Spaced above said core is a metallic diaphragm which can be caused to move in such a manner as to vary the air gap between the core and diaphragm. As this gap is varied, the electric inductance of the unit changes and this change is utilized to alter the frequency of an oscillator.

While there has been shown and described in the foregoing a beat frequency system for converting electric reactance changes into corresponding current changes which has the advantage that a desired low beat or output frequency may be obtained by a proper choice of the oscillator frequencies, while the latter may be sufficiently high so as to respond to extremely slight reactance changes, it is apparent that the intermittent indication and calibration of the system according to the invention may be used with equal advantage in equivalent arrangements of this type. Thus, the invention applies with equal advantage to systems using a single auxiliary oscillator energizing a frequency discriminator or measuring device directly or after suitable amplification. In such a case, the frequency measurement may be of an intermittent nature in the manner proposed by the invention, while the intervals between successive measuring periods are again utilized to correct or readjust the oscillator frequency by means of a frequency control circuit in the manner described herein.

Such a simplified system as may be obtained by omitting the oscillator 11 and the mixer tube 14 in Figure 1 and by connecting the reactance tube 33 to effectively control the oscillator 10, to maintain the oscillator frequency at a substantially constant value during the connecting periods of the standard or comparison condenser 41.

In its most general terms and aspects, therefore, the invention involves the provision of an intermittent calibration system in the form of an automatic frequency control circuit intermittently operative during the intervals between successive test or indicating periods of the variable reactance to be determined or translated.

Furthermore, the automatic frequency control or stabilizing circuit for correcting the comparison or calibration frequency of the system may be of any type known in the art. Thus, in place of the simple slope filter 27 as a frequency discriminator or error detector, a so-called off-tuned or phase-type discriminator may be provided adapted to produce a direct current control potential varying in either sense from zero as the comparison frequency increases above or decreases below, respectively, a desired value. In arrangements of this type, the stabilization of the comparison frequency is determined substantially by the resonant or natural frequency of a tuned circuit or equivalent resonant means, whereby a special comparison condenser may be dispensed with.

Thus, according to a well known type of frequency detector used in connection with automatic frequency stabilizing devices, the frequency to be controlled is applied to the input of a transformer having primary and secondary windings resonant to the comparison or calibrating frequency. The input and output voltages of the transformer are combined to produce both sum and difference voltages, both of which are rectified separately and combined in opposition, to result in a direct current control potential varying both in sense and magnitude in proportion to the deviation of the frequency from the desired value. This control potential serves to vary the frequency of either of the beating oscillators in such a sense as to restore the comparison beat frequency to its desired value.

A further type of discriminator especially suited for the present invention comprises a single resonant circuit connected between one control grid and the cathode of a multi-grid vacuum tube, the potential or variable frequency to be detected being applied to a different control grid of the tube. In such an arrangement, described in greater detail in United States Patent #2,208,091, the direct plate current of the tube varies in either direction from a normal value in direct proportion to the deviations of the input frequency from a given value determined by the tuning frequency of the resonant circuit.

The control of the frequency of either of the oscillators 10 and 11 in accordance with the control potential produced by the frequency discriminator or error detector may be effected by means of any known capacitative or inductive reactance capable of being controlled by a varying electric potential or current, such as an electronic reactance control tube as shown in the drawing, an iron core inductance having a direct current magnetization control winding or any equivalent adjustable reactance device known in the art.

In the foregoing, the invention has been described with reference to a few specific illustrative devices. It will be apparent, however, that variations and modifications, as well as the substitution of equivalent elements and circuits for those disclosed herein, may be made, without departing from the broader spirit and scope of the invention as set forth in the appended claims. The specification and drawings are accordingly to be regarded in an illustrative rather than in a limiting sense.

I claim:

1. In a reactance translation system, an oscillator, a variable reactance to be translated, a stabilizing reactance, switch means to alternately and periodically connect said variable and stabilizing reactances to said oscillator to correspondingly control the oscillating frequency, a first frequency discriminator adapted to convert input frequency variations into proportionate output current changes, automatic frequency control means comprising a second frequency discriminator and reactance means controlled thereby and arranged to vary the frequency of said oscillator, and means operating in synchronism with said switch means to alternately connect the output of said oscillator to said first and second discriminator, to maintain alternating operating and stabilizing cycles of said oscillator, said automatic frequency control means having a time constant sufficient to cause the periodic frequency control to persist from the end of one to the beginning of the next stabilizing cycle of said oscillator.

2. In a reactance translation system, an oscillator, a variable reactance to be translated, a stabilizing reactance having a fixed value equal to the average of said variable reactance, a first periodic switch to alternately and periodically connect said variable and stabilizing reactances to said oscillator to correspondingly control the oscillating frequency, a first frequency discriminator adapted to convert input frequency variations into proportionate output current changes, automatic frequency control means comprising a second frequency discriminator and reactance means controlled thereby arranged to control the frequency of said oscillator, a second periodic switch operating in synchronim with said first switch to alternately connect the output of said oscillator to said first and second discriminator, to thereby maintain alternating operating and stabilizing cycles of said oscillator, said automatic frequency control means having a time constant sufficient to cause the periodic frequency control to persist from the end of one to the beginning of the next stabilizing cycle of said oscillator.

3. In a reactance translation system, an oscillator, a variable reactance to be translated, a stabilizing reactance having a fixed value equal to the average of said variable reactance, a first periodic switch to alternately and periodically connect said variable and stabilizing reactances to said oscillator to correspondingly control the oscillating frequency, a first frequency discriminator adapted to convert input frequency variations into proportionate output current changes, automatic frequency control means comprising a second frequency discriminator and reactance means controlled thereby arranged to control the frequency of said oscillator, a second periodic switch operating in synchronism with said first switch to alternately connect the output of said oscillator to said first and second discriminator, to thereby maintain alternate operating and stabilizing cycles of said oscillator, said automatic frequency control means having a time constant sufficient to cause the periodic frequency control to persist from the end of one to the beginning of the next stabilizing cycle of said oscillator, and means to cause the closing periods of said second switch to be a fraction of the corresponding closing periods of said first switch.

4. In a system as claimed in claim 3, wherein said last means comprises a periodic voltage generator simultaneously controlling said first and second switch, and amplitude limiting means inserted between said generator and said second switch.

5. In a reactance translation system, an oscillator, a variable reactance to be translated, a stabilizing reactance having a fixed value different from and being outside the range of variation of said first reactance, switch means to alternately and periodically connect said variable and stabilizing reactances to said oscillator to correspondingly control the oscillating frequency, a first discriminator connected to said oscillator and adapted to convert input frequency variations into corresponding output current changes and including filter means responsive to accept the frequencies of said oscillator during the connection thereto of said variable reactance, automatic frequency control means comprising a second frequency discriminator connected to said oscillator and variable reactance means controlled thereby and arranged to vary the frequency of said oscillator, said second frequency discriminator including filter means to accept the oscillating frequency during the connecting periods of said stabilizing reactance, to maintain alternating operating and frequency stabilizing cycles of said oscillator, said automatic frequency control means having a time constant sufficient to cause the periodic frequency control to persist from the end of one to the beginning of the next stabilizing cycle of said oscillator.

6. In a reactance translation system, a pair of oscillators, a heterodyning frequency converter excited by said oscillators to produce an intermediate frequency, a variable reactance to be translated, a stabilizing reactance, switch means to alternately and periodically connect said variable and stabilizing reactances to one of said oscillators to correspondingly vary the frequency thereof, frequency discriminating means adapted to convert input frequency variations into proportionate output current changes, automatic frequency control means for the other of said oscillators, and means operating in synchronism with said switch means to alternately connect said discriminating means and the input of said frequency control means to said frequency converter in synchronism with said switch means, to thereby maintain alternate operating and calibrating cycles for said intermediate frequency, said automatic frequency control means having a time constant sufficient to cause the periodic frequency control of said intermediate frequency to persist from the end of one to the beginning of the next stabilizing cycle of the intermediate frequency.

7. In a reactance translation system, a pair of oscillators, a heterodyning frequency converter excited by said oscillators to produce an intermediate frequency, a variable reactance to be translated, a fixed stabilizing reactance having a value of the order of the average of said variable reactance, a first periodic switch to alternately and periodically connect said variable and stabilizing reactances to one of said oscillators to correspondingly control the frequency thereof, frequency discriminating means adapted to convert input frequency variations into proportionate output current changes, automatic frequency control means for the other of said oscillators, a second periodic switch operated in synchronism with said first switch, to alternately connect said discriminating means and the input of said frequency control means to said frequency converter, to thereby maintain alternate operating and stabilizing cycles of the intermediate frequency, said automatic frequency control means having a time constant sufficient to cause the periodic frequency control of said intermediate frequency to persist from the end of one to the beginning of the next stabilizing cycle.

8. In a capacitance translating system, a pair of oscillators, a heterodyning frequency converter excited by said oscillators to produce an intermediate frequency, a variable capacity to be translated, a fixed stabilizing capacity having a value of the order of the average of said variable capacity, a first periodic switch to alternately and periodically connect said variable and stabilizing capacities to one of said oscillators to correspondingly control the frequency thereof, a frequency discriminator adapted to convert input frequency variations into proportionate output current changes, automatic frequency control means for the other of said oscillators, a second periodic switch operating in synchronism with said first switch to alternately connect said discriminator and the input of the frequency control means to said converter, to thereby maintain alternate operating and stabilizing cycles for the intermediate frequency, said automatic frequency control means having a time constant sufficient to cause the periodic frequency control of the intermediate frequency to persist from the end of one to the beginning of the next stabilizing cycle.

9. In a reactance translation system, an oscillator to generate high frequency comparison oscillations, variable reactance means subject to reactance variations to be translated, switch means to periodically connect said variable reactance means to said oscillator to correspondingly vary the oscillating frequency in respect to said comparison frequency, frequency discriminator means adapted to convert input frequency variations into proportionate output current changes, automatic frequency control means for said oscillator to maintain said comparison frequency substantially constant, and selective means to apply the output of said oscillator to said discriminator means during the periods when said variable reactance means is connected to said oscillator and to apply the output of said oscillator to said automatic frequency control means during the intervening periods when said variable reactance means is disconnected from said oscillator, whereby to effect an alternate and periodic translation of said reactance variations and a stabilization of said oscillator comparison frequency by said oscillator and discriminator means and by said automatic frequency control means, respectively, said automatic frequency control means having a time constant sufficient to cause the intermittent frequency stabilization of said oscillator to persist from the end of one to the beginning of the next stabilizing period.

References Cited in the file of this patent
UNITED STATES PATENTS

| Number | Name | Date |
| --- | --- | --- |
| 2,273,097 | Foster et al. | Feb. 17, 1942 |
| 2,415,799 | Reifel et al. | Feb. 11, 1947 |
| 2,424,833 | Korman | July 29, 1947 |
| 2,498,306 | Stedman | Feb. 21, 1950 |
| 2,541,454 | White et al. | Feb. 13, 1951 |
| 2,567,286 | Hugenholtz | Sept. 11, 1951 |